(12) United States Patent
Rubenstein

(10) Patent No.: US 12,326,725 B2
(45) Date of Patent: Jun. 10, 2025

(54) SENSING AND COMMUNICATION SYSTEM FOR ROTORCRAFT

(71) Applicant: Northwestern University, Evanston, IL (US)

(72) Inventor: Michael S. Rubenstein, Wilmette, IL (US)

(73) Assignee: Northwestern University, Evanston, IL (US)

( * ) Notice: Subject to any disclaimer, the term of this patent is extended or adjusted under 35 U.S.C. 154(b) by 387 days.

(21) Appl. No.: 16/488,978

(22) PCT Filed: Feb. 27, 2018

(86) PCT No.: PCT/US2018/019831
§ 371 (c)(1),
(2) Date: Aug. 27, 2019

(87) PCT Pub. No.: WO2018/157103
PCT Pub. Date: Aug. 30, 2018

(65) Prior Publication Data
US 2020/0064829 A1 Feb. 27, 2020

Related U.S. Application Data

(60) Provisional application No. 62/464,041, filed on Feb. 27, 2017.

(51) Int. Cl.
*G05D 1/00* (2024.01)
*B64U 10/10* (2023.01)
(Continued)

(52) U.S. Cl.
CPC ............ *G05D 1/0022* (2013.01); *B64U 10/10* (2023.01); *B64U 30/20* (2023.01); *B64U 50/19* (2023.01); *B64U 2201/20* (2023.01)

(58) Field of Classification Search
CPC ............... G05D 1/0022; B64C 39/024; B64C 2201/024; B64C 2201/108; B64C 2201/146
(Continued)

(56) References Cited

U.S. PATENT DOCUMENTS 3,550,130 A * 12/1970 Shaw .................. G01S 3/52
342/418
3,778,835 A * 12/1973 Scharf .................. G01S 3/50
342/386
(Continued)

FOREIGN PATENT DOCUMENTS

AU 2011258700 A1 * 1/2013 ............ G01S 19/53
CN 103744429 A * 4/2014
(Continued)

OTHER PUBLICATIONS

Austerlitz, Howard, "Data Acquisition Techniques Using PCs" Second Edition, Chapter 2—Analog Signal Transducers, 2003. (Year: 2003).*
(Continued)

*Primary Examiner* — Marc Burgess
*Assistant Examiner* — John D Holman
(74) *Attorney, Agent, or Firm* — Bell & Manning, LLC

(57) ABSTRACT

A system for determining positional information of a rotorcraft includes a central controller and a first sensor unit. The first sensor unit is mounted to a first rotating portion of the rotorcraft and is in communication with the central controller. The first sensor unit includes one or more first receivers configured to receive signals from a remote transmission source. The first sensor unit also includes a processor configured to determine a bearing of the rotorcraft relative to the remote transmission source based in part on the signals received from the remote transmission source. The first
(Continued)

sensor unit further includes a transmitter configured to transmit the bearing of the rotorcraft to a central controller of the rotorcraft.

17 Claims, 7 Drawing Sheets

(51) Int. Cl.
 *B64U 30/20* (2023.01)
 *B64U 50/19* (2023.01)
(58) Field of Classification Search
 USPC .............................................. 701/3
 See application file for complete search history.

(56) References Cited

U.S. PATENT DOCUMENTS

| | | | | |
|---|---|---|---|---|
| 7,546,975 | B2* | 6/2009 | Richardson | B64C 27/24 244/6 |
| 9,758,258 | B2* | 9/2017 | Fang | B64C 27/008 |
| 2004/0251377 | A1* | 12/2004 | Dammar | B64C 39/00 244/17.11 |
| 2006/0113949 | A1* | 6/2006 | Nishimura | H02K 19/36 318/723 |
| 2009/0195454 | A1* | 8/2009 | Apostolos | G01S 5/04 342/375 |
| 2011/0026364 | A1* | 2/2011 | Lee | G01S 5/28 367/127 |
| 2014/0226153 | A1 | 8/2014 | Sun et al. | |
| 2014/0347648 | A1 | 11/2014 | Roberts | |
| 2015/0219523 | A1 | 8/2015 | White et al. | |
| 2018/0247544 | A1* | 8/2018 | Mustafic | G08G 5/0039 |
| 2020/0033888 | A1* | 1/2020 | Han | G01S 5/06 |

FOREIGN PATENT DOCUMENTS

| | | | |
|---|---|---|---|
| CN | 204925150 U | * | 12/2015 |
| JP | H05256934 A | * | 10/1993 |
| KR | 100745088 B1 | * | 8/2007 |
| WO | WO 2015/179797 A1 | | 11/2015 |

OTHER PUBLICATIONS

The International Search Report and Written Opinion issued for International Patent Application No. PCT/US2018/019831 on Jun. 26, 2018, pp. 1-13.

\* cited by examiner

SENSING AND COMMUNICATION SYSTEM FOR ROTORCRAFT

CROSS-REFERENCE TO RELATED APPLICATIONS

The present application is a U.S. national stage application that claims the priority benefit of PCT/US2018/019831 filed on Feb. 27, 2018, which claims the priority benefit of U.S. Provisional Patent App. No. 62/464,041 filed on Feb. 27, 2017, the entire disclosures of which are incorporated herein by reference.

BACKGROUND

A rotorcraft refers to an aircraft that utilizes rotor blades to generate lift and thrust such that the aircraft can fly. A rotorcraft typically includes rotor blades mounted to a rotating shaft to form a rotor assembly, and the rotorcraft may include multiple rotor assemblies that work in cooperation with one another to allow flight. For example, a quadcopter or quadrotor refers to a rotorcraft that includes four rotor assemblies, two of which rotate in a clockwise direction and two of which rotate in a counterclockwise direction. Other types of rotorcraft include helicopters, cyclocopters, autogyros, gyrodynes, etc.

SUMMARY

An illustrative system for determining positional information of a rotorcraft includes a central controller and a first sensor unit. The first sensor unit is mounted to a first rotating portion of the rotorcraft and is in communication with the central controller. The first sensor unit includes one or more first receivers configured to receive signals from a remote transmission source. The first sensor unit also includes a processor configured to determine a bearing of the rotorcraft relative to the remote transmission source based in part on the signals received from the remote transmission source. The first sensor unit further includes a transmitter configured to transmit the bearing of the rotorcraft to a central controller of the rotorcraft.

An illustrative method for determining positional information of a rotorcraft includes receiving, by a first sensor unit mounted on a first rotating portion of the rotorcraft, signals transmitted from a remote transmission source. The method also includes determining, by a processor of the first sensor unit, a bearing of the rotorcraft relative to the remote transmission source based in part on the signals received from the remote transmission source. The method further includes transmitting, by a transmitter of the first sensor unit, the bearing of the rotorcraft to a central controller of the rotorcraft.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
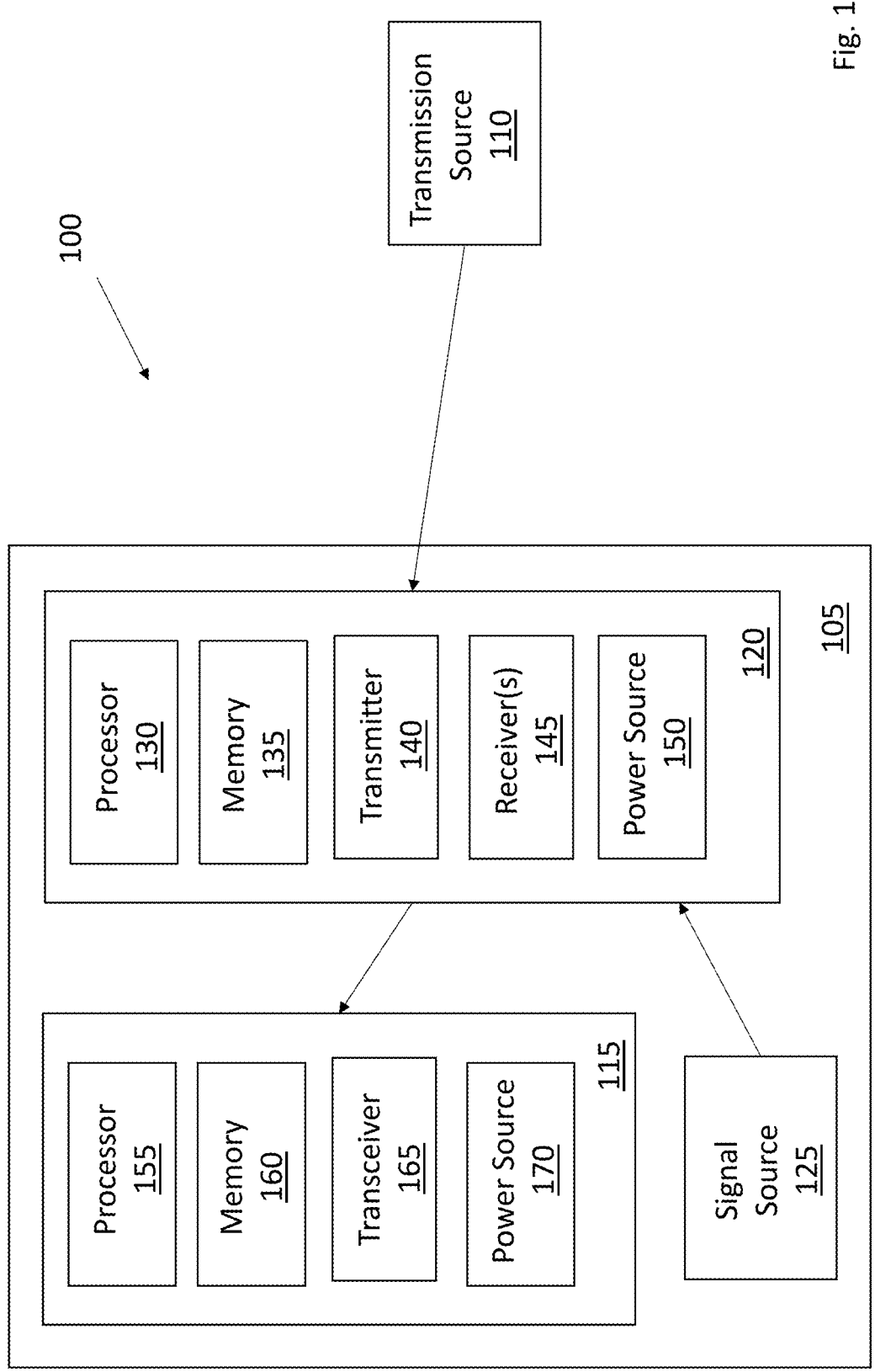
FIG. 1 is a block diagram depicting components of a rotorcraft system in accordance with an illustrative embodiment.

Rotorcraft such as quadrotors are becoming increasingly popular for entertainment, education, defense systems, package delivery, etc. However, little navigational sensing is currently available to control these systems, and the sensing that exists has limited accuracy, works only outdoors (or in some cases only indoors), is expensive, and/or consumes a significant amount of power. Some existing systems for bearing/distance sensing use global positioning system (GPS) technology, which only works outdoors and has limited accuracy. Another existing system uses motion capture via pre-positioned cameras to implement navigation, but such systems only work in indoor settings such as expensive camera rooms. Yet another existing system is camera based navigation, which involves expensive cameras, complicated computations, and high energy usage which results in reduced operational time in between battery charges.

Described herein are a system and method that embeds simple sensors into rotating propellers of a rotorcraft to provide low cost sensing of bearing, elevation, and distance, as well as communication with base stations, other rotorcraft, and other robots. This sensing functionality can be used for remote control of rotorcraft, autonomous rotorcraft control, high precision short-range rotorcraft guidance, and rotorcraft-to-rotorcraft swarming and collision avoidance. The description herein is with reference to rotorcraft, such as a drone. However, it is to be understood that the described concepts are not limited to rotorcraft, but can rather be applied to any robot or machine that includes (or is improvised to include) a rotating component.

The sensing systems and methods described herein provide several advantages over existing technology, including a simpler and more intuitive interface for remotely controlling rotorcraft. The systems also allow for absolute positioning and drift free control of rotorcraft, and rotorcraft-to-rotorcraft sensing and communication with significantly increased close range accuracy. The systems work indoors or outdoors, and are more accurate and less expensive than existing solutions. The improved accuracy also allows for more precise docking to a landing pad, base station, charging station, etc.

In an illustrative embodiment, the systems described herein involve placing sensor units in or on a rotational portion of a rotorcraft, such as propeller blades, a propeller shaft, or a motor component. In an illustrative embodiment, the sensor units include receivers that are configured to receive a signal from a remote transmission source and from a signal source mounted on the rotorcraft. In another illustrative embodiment, the receivers are narrow angle receivers that can be used to measure the intensity of a signal from the remote transmission source, such as a base station, another rotorcraft, a docking station, another type of robot, etc.

The receivers can also determine the angle at which they are facing directly towards the transmission source based on the signal received from the signal source. Specifically, in an embodiment in which the signal source is mounted to the rotorcraft, the angular position of the propeller with respect to the rotorcraft is determined when the propeller crosses over a portion of the rotorcraft chassis that includes the signal source. In an illustrative embodiment, the signal source emits light such as infrared light which is detected by the receiver. Between crossings of the receiver and the signal source mounted on the rotorcraft, the angular position of the receiver (and thus the propeller) can be determined using an elapsed time analysis or inertial measurement unit (IMU) integration. This allows the sensor to measure the speed of the propeller during the previous rotation, which taken with the time since last passing over the propeller arm assembly, allows the sensor unit to estimate a current angular position of the receiver. Alternatively, the angular position of the sensor unit can be determined magnetically, using an encoder configured to measure angular position, using motor controller feedback if the motor controller tracks the angular position of the motor, or using different types of transmission signals such as visible light, radio waves, etc.

As discussed in more detail below, the exact angle of an incoming message from a transmission source (i.e., bearing) can be determined by analyzing signal intensity of signals received from the transmission source along with the determined angle of the propeller relative to the signal source. Azimuth (elevation) can be determined using a sensor unit with multiple receivers positioned at different angles, and distance can be measured by the parallax between two sensor units located on two different propeller arm assemblies. In one implementation, it can be assumed that the propellers have no acceleration. Alternatively, aggressive maneuvers caused by quick acceleration of propellers can be addressed by using an accelerometer or gyro within the sensor unit to determine acceleration, or by using commanded motor speed changes to directly determine acceleration. The accelerometer or gyro is used in conjunction with the techniques described herein to integrate and compute the current position based on a previously measured propeller speed and detected or predicted acceleration.

In one embodiment, the receivers in the sensor unit are passive in that they receive but do not transmit. Such receivers can be operated at very low power, on the order of a few milliwatts. A small battery can be used to provide this power. However, use of a battery may cause balance issues for the rotorcraft. In one embodiment, an electrical slip ring can be used to transfer power to the propeller for powering the sensor unit. Other methods to transfer power may also be used, such as passing a coil in the propeller over a magnet in the rotorcraft arm to generate electromagnetic energy, solar power, inductive power, etc.

Upon determining the bearing and elevation of a rotorcraft relative to a transmission source, this information is communicated from the sensor unit onboard the propeller to the central controller on the rotorcraft. Received signal information can also be communicated from multiple sensor units to the central controller such that the central controller can determine a distance to the transmission source. In an embodiment in which an electric slip ring is used to power the sensor unit, the information can be sent to the central controller using the same slip ring. Alternatively, other forms of wireless communication such as radio frequency waves, short-range communication such as Bluetooth®, wi-fi, infrared, inductive coupling, etc. may be used to transmit the information.

In one embodiment, instead of just emitting a constant signal, the transmission source can be configured to modulate the transmitted signal to encode information therein. This will allow the sensor unit to detect positional information relative to the transmission source as well as receive a message from it, allowing for communication. This communication enables the sensor to easily distinguish from multiple transmission sources (for example using an ID encoded in the message). If each rotorcraft has a transmitter affixed to itself, then the rotorcraft will be able to sense one another and communicate with each other. For example, the chassis of a rotorcraft or other robot can include an omnidirectional transceiver which can be used to communicate with other rotorcraft, robots, base stations, etc. Messages and information received by the sensors can be passed from the sensor unit to the central controller through a slip ring or wireless communication such as Bluetooth® low energy, radio frequency waves, regular Bluetooth®, wi-fi, infrared, inductive coupling, etc.

FIG. 1 is a block diagram depicting components of a rotorcraft system 100 in accordance with an illustrative embodiment. In alternative embodiments, additional, fewer, and/or different components may be included. The rotorcraft system 100 includes a rotorcraft 105 that is in communication with a transmission source 110. The transmission source 110 can be any signal-emitting source, including another rotorcraft, a remote control unit, a docking station, a charging station, a base station, a user device such as a cellular phone, etc. The rotorcraft 105 includes a central controller 115, a sensor unit 120, and a signal source 125. Also, although FIG. 1 depicts a single sensor unit 120, in practice two or more sensor units will be included on the rotorcraft 105 so that distance can be calculated as discussed below. For example, on a quadrotor, a different sensor unit may be included in or on each of the four arm assemblies. It is also to be understood that an actual rotorcraft includes additional components not depicted in FIG. 1, such as motors, propellers, housings, etc.

Figure 2:
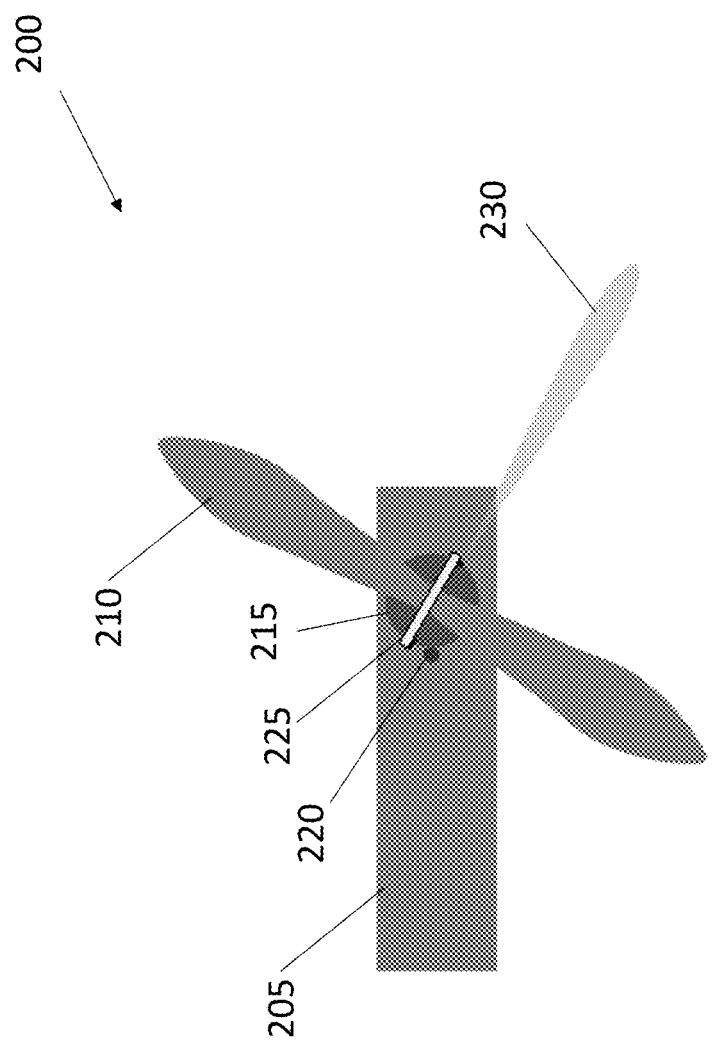
FIG. 2 is a diagram depicting a plan view of a rotorcraft arm assembly in accordance with an illustrative embodiment.
Figure 3:
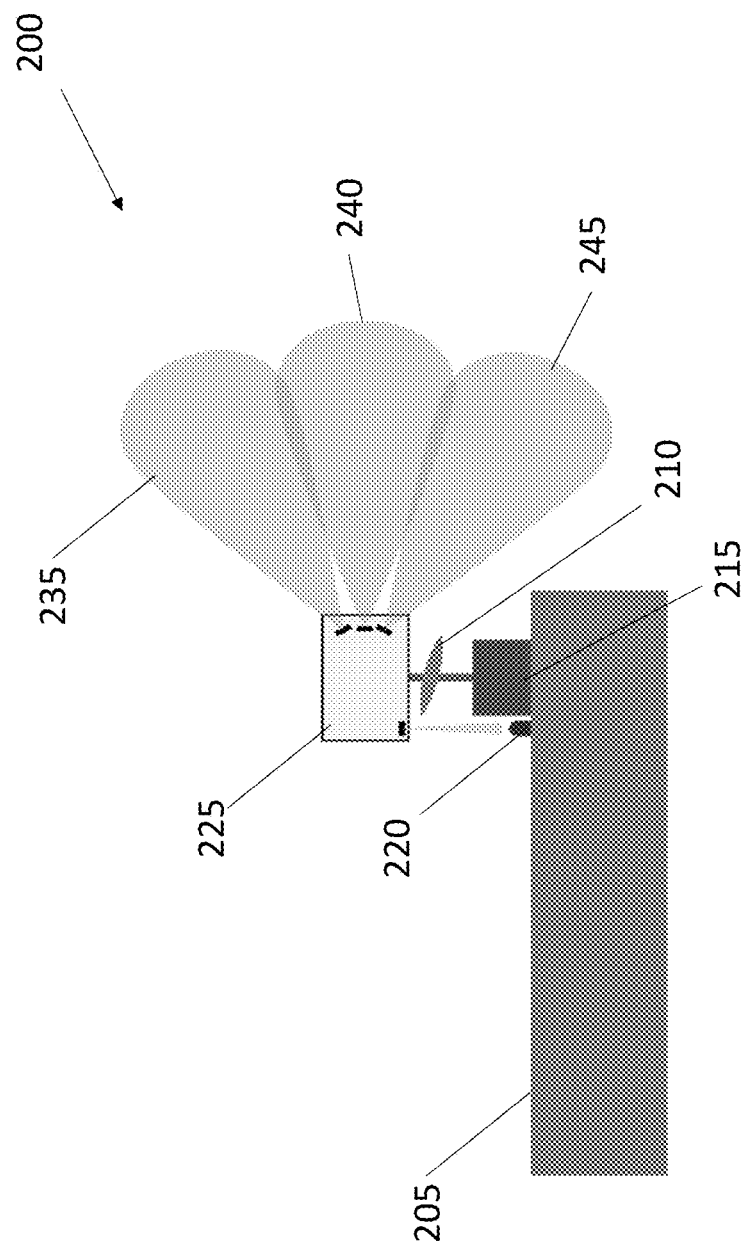
FIG. 3 is a diagram depicting a side view of the rotorcraft arm assembly of FIG. 2 in accordance with an illustrative embodiment.

In an illustrative embodiment, the sensor unit 120 is mounted to a rotating portion of an arm assembly of the rotorcraft 105, as depicted in FIGS. 2 and 3, which are discussed in detail below. The sensor unit 120 of the rotorcraft 105 includes a processor 130, a memory 135, a transmitter 140, receiver(s) 145, and a power source 150. The receiver(s) 145 are configured to receive signals from transmission source 110. In an illustrative embodiment, the receiver(s) 145 include two or more receivers positioned at varying angles. Alternatively, a single receiver 145 may be used in some embodiments. In one embodiment, the receiver(s) 145 can be in the form of infrared receivers that are configured to detect infrared signals emitted from transmission source 110. In such an embodiment, transmission source 110 can include an infrared light source such as one or more infrared light emitting diodes (LEDs). In alternative embodiments, signals other than infrared may be used for communication between transmission source 110 and sensor unit 120, such as visible light, radio waves, etc.

The receiver(s) 145 are also configured to receive signals from signal source 125. The receiver(s) 145 which receive signals from the signal source 125 can be the same as or different from the receiver(s) 145 that receive signals from the transmission source 110. In an illustrative embodiment, the signal source 125 is mounted to a stationary portion of the rotorcraft 105 and configured to transmit a constant signal in the form of infrared light, visible light, radio waves, etc. As discussed in more detail below, the receiver(s) 145 receive the signal from signal source 125 and use it to determine an angular position of the sensor unit 120 relative to the signal source 125. As also discussed in more detail below, the angular position of the sensor unit 120 is used in conjunction with information received from the transmission source 110 to determine the position of the rotorcraft 105.

In an alternative embodiment, the signal source 125 and a corresponding receiver may not be used. In such an embodiment, the angular position of the sensor unit 120 can be determined using an encoder, using motor controller feedback, using a magnet and sensor, using a physical switch, or using any other components which can determine the angular position of the sensor unit 120 at a given time.

The memory 135 of the sensor unit 120 is used to store information received from the transmission source 110 and the signal source 125. Such information can include signal intensity, timing information, distances between fixed receivers, angular positioning of receivers, and other information modulated into the signal by the transmission source 110. The information modulated into the signal can include an identifier of the transmission source 110, navigational instructions, locations of other transmission sources, etc. The memory 135 can also store one or more algorithms for manipulating received information and determining position of the rotorcraft 105. The processor 130 of the sensor unit 120, which can be a microprocessor, is used to execute the one or more algorithms stored in the memory 135, calculate bearing and elevation values, control communication, control data storage, etc. As discussed in more detail below, a distance of the rotorcraft 105 to the transmission source 110 is calculated using signals received from two or more different sensor units mounted on the rotorcraft. In an illustrative embodiment, each of the sensor units provides received signal information to the central controller 115 such that the central controller 115 is able to calculate the distance.

The transmitter 140 of the sensor unit 120 is configured to communicate received and/or calculated information from the sensor unit 120 to the central controller 115 of the rotorcraft 105. The central controller 115 can use the information received from the sensor unit to control navigation of the rotorcraft 105. The transmitter 140 can communicate to the central controller 115 using infrared signals, radio frequency signals, wi-fi, Bluetooth®, and/or any other communication algorithm. In an embodiment in which the rotorcraft 105 acts as a transmission source, the transmitter 140 can also be used to transmit a signal for detection by other rotorcraft.

The power source 150 of the sensor unit 120 is configured to provide power to the various sensor unit components. In one embodiment, a slip ring can be used as the power source 150. In another embodiment, the power source 150 can utilize an inductive power transfer from a chassis of the rotorcraft to power the sensor unit 120. In another embodiment, electromagnetic power transfer can be used by placing a coil in the propeller and a magnet on the chassis (or vice versa) such that propeller motion passes the coil over the magnet, resulting in an induced current. A small battery and/or a solar panel may also be used as the power source 150.

The central controller 115 of the rotorcraft 105 includes a processor 155, a memory 160, a transceiver 165, and a power source 170. The memory 160 is configured to store algorithms and information used for navigation and control of the rotorcraft 105. The processor 155 is configured to execute the algorithms stored in the memory 160. In embodiments in which the processor 130 of the sensor unit 120 does not perform calculations, the processor 155 of the central controller 115 can also be used to perform calculations for bearing and elevation based on information received by the sensor unit 120. The processor 155 can also calculate distance from the transmission source 110 based on received signal information from two or more different sensor units. The transceiver 165 is used to receive data from the sensor unit 105 and/or from other sources such as remote control unit, a user computing device, a database, etc. In an embodiment in which the rotorcraft 105 acts as a transmission source, the transceiver 165 can also be used to transmit a signal to another rotorcraft which can be used for sensing and/or communication. The power source 170 is used to power the rotorcraft 105 and is typically in the form of a battery.

FIG. 2 is a diagram depicting a top view of a rotorcraft arm assembly 200 in accordance with an illustrative embodiment. FIG. 3 is a diagram depicting a side view of the rotorcraft arm assembly 200 of FIG. 2 in accordance with an illustrative embodiment. The rotorcraft arm assembly 200 includes a rotorcraft arm 205, a propeller 210, a propeller motor 215, a signal source 220 mounted on the rotorcraft arm 205 in a stationary manner, and a sensor unit 225. An angle of sensitivity 230 in the rotation (or bearing) direction is depicted in FIG. 2. Angles of sensitivity 235, 240, and 245 in the elevation (or up/down) direction are depicted in FIG. 3. It can be seen that the angle of sensitivity 230 in the bearing direction is narrow, and that the angles of sensitivity 235, 240, and 245 in the elevation direction are wider and varying based on the different angular positioning of the receivers. In one embodiment, the angle of sensitivity 230 in the bearing direction can be approximately 5 degrees, although other values may be used. In another embodiment, blinders can be used to block light to the sensor from every angle except for the angle of sensitivity range. It is noted that even sensors with wide angles of sensitivity can be used since they are still most sensitive in the forward direction, which allows determination of the direction from which the highest intensity signal is received. In such an embodiment, the system is configured to identify a direction of peak signal intensity using any techniques known in the art.

In an illustrative embodiment, the sensor unit 225 is rigidly mounted to the propeller 210, a shaft upon which the propeller 210 is mounted, or a rotating portion of the propeller motor 215 such that the sensor unit 225 rotates as the propeller 210 rotates. The sensor unit 225 can be mounted using standard clamps and fasteners, via an adhesive, via a weld, via solder, or by any other standard attachment technique. In one embodiment, the sensor unit 225 may be directly incorporated into the shaft or the propeller such that the sensor unit 225 is not externally mounted. The sensor unit 225 is used primarily to receive information that can be used to determine a bearing, distance, and elevation relative to a transmission source, which can be a base station, a docking station, a remote control unit, another rotorcraft, a robot, etc. The transmission source can be stationary or affixed to a moving robot. In an illustrative embodiment, the transmission source transmits a signal (e.g., infrared light), an intensity of which is detected by the sensor unit 225. The sensor unit also detects transmissions from the signal source 220 for determining a relative angle of the sensor unit 225 at a given time.

As depicted in FIG. 3, sensor unit 225 includes three receivers for receiving signals from a transmission source and one receiver for receiving signals from the signal source 220. In alternative embodiments, fewer or additional receivers may be used. As shown in FIG. 3, an uppermost transmission source receiver is positioned such that a midline of the angle of sensitivity 235 is at an upward 45 degree angle relative to the rotorcraft arm 205, a middle transmission source receiver is positioned such that a midline of the angle of sensitivity 240 is parallel to the rotorcraft arm 205, and a lower transmission source receiver is positioned such that a midline of the angle of sensitivity 245 is at a downward 45 degree angle relative to the rotorcraft arm 205. As discussed in more detail below, these varying positions of the receivers are used in determining elevation of the rotorcraft. In alternative embodiments, different angles and/or positions may be used for the receives.

In practice, the receivers of the sensor unit 225 measure the intensity of a signal from the transmission source in the direction of its sensitivity. As each of the sensor units (e.g., four on a quadrotor) rotates with its respective propeller, each of the receivers determines the intensity of light from a given transmission source (there can be multiple) in the direction of the bearing angle it is currently facing. By comparing this intensity of a given transmission source for all bearing angles in a rotation, the sensor unit can detect peaks of light, and thus the bearing direction to the transmission source. As sensors are pointing in different elevation directions, a comparison of intensity for different receivers at the same bearing can be used to detect the elevation angle relative to the transmission source. These procedures are discussed in more detail below.

Figure 4:
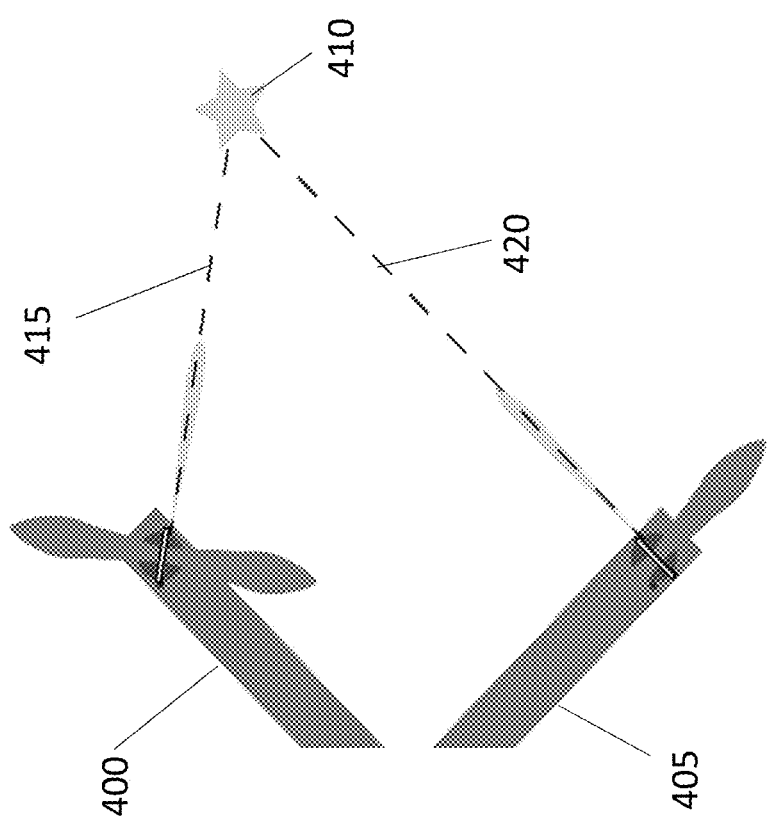
FIG. 4 is a diagram depicting a relationship between two rotorcraft arm assemblies and a transmission source in accordance with an illustrative embodiment.

FIG. 4 is a plan view depicting a relationship between two rotorcraft arm assemblies 400, 405 and a transmission source 410 in accordance with an illustrative embodiment. Each of the rotorcraft arm assemblies 400, 405 includes a sensor unit and a signal source. For purposes of determining bearing, the sensor unit mounted to the rotorcraft arm assembly 400 receives a signal 415 from the transmission source 410 in a narrow angle of sensitivity. Similarly, a sensor unit mounted to the rotorcraft arm assembly 405 receives a signal 420 from the transmission source 410 in a narrow angle of sensitivity. An intensity of the received signals 415 and 420 (from the transmission source 410) is determined by each of the sensor units as a function of time. Additionally, the intensity of signals received from the signal sources is determined by each of the sensor units as a function of time. As discussed with reference to FIG. 5, this information forms the basis for determining a bearing of the rotorcraft relative to the transmission source 410.

Figure 5:
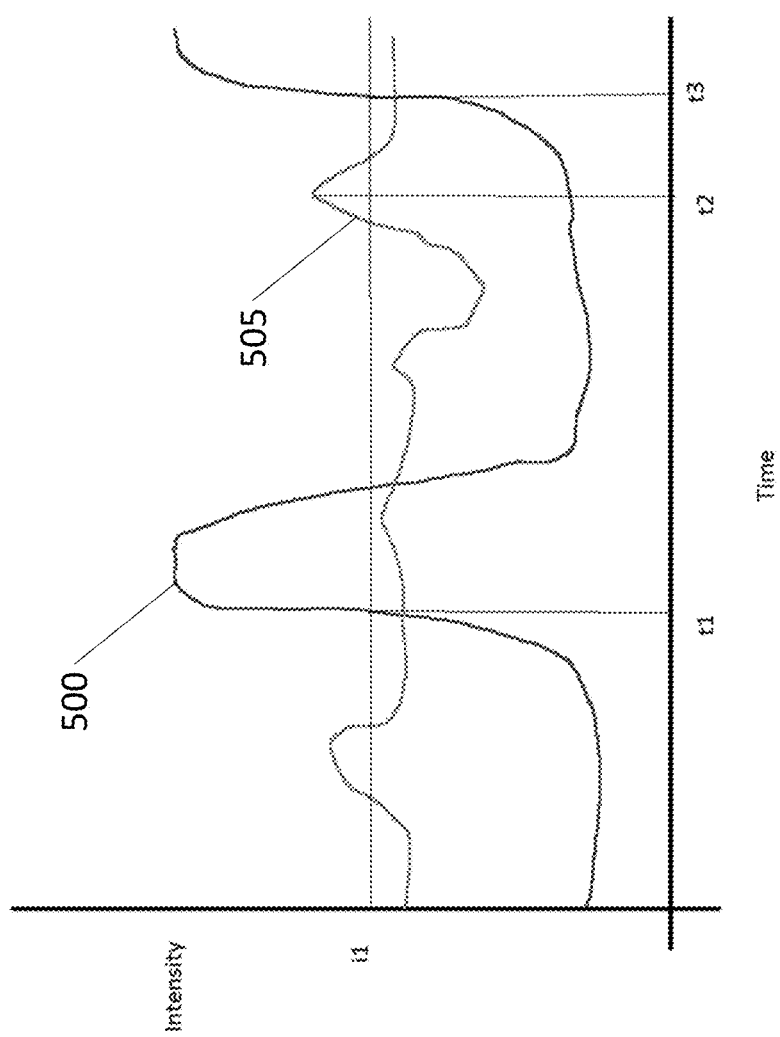
FIG. 5 is a chart depicting intensity of received signals versus time in accordance with an illustrative embodiment.

FIG. 5 is a chart depicting intensity of received signals versus time in accordance with an illustrative embodiment. The information in FIG. 5 is used by the sensor unit (or alternatively by the central controller) to determine bearing. A plot 500 depicts signal intensity over time of signals received from a signal source mounted on the rotorcraft, and a plot 505 depicts signal intensity over time of signals received from a remote transmission source. In FIG. 5, the propeller is at its zero degree rotation point when the plot 500 (i.e., signals received from the signal source mounted on the rotorcraft) has a positive crossing of the i1 value. In one embodiment, the i1 value can be halfway between the maximum and minimum values. Alternatively, the value i1 can be relatively arbitrary and other values of i1 can be used. By measuring the time between these crossings (t3–t1), the time per rotation can be computed as t3–t1. The position of the propeller (in radians) at anytime, t, between t1 and t3 is then computed as an angle=2*pi*(t–t1)/(t3–t1). As discussed above, in alternative embodiments an encoder or feedback from a motor controller may be used instead of signals from a signal source to determine angular position of the propeller at a given time. The time t2 is when the sensor unit detects a highest intensity value of the signal received from the transmission source (plot 505). The time at which the sensitivity received from the transmission source is highest is also the time at which a receiver of the sensor unit is pointing directly towards the transmission source. As a result, the bearing angle of the receiver relative to the transmission source is computed as 2*pi*(t2–t1)/(t3–t1).

Figure 6:
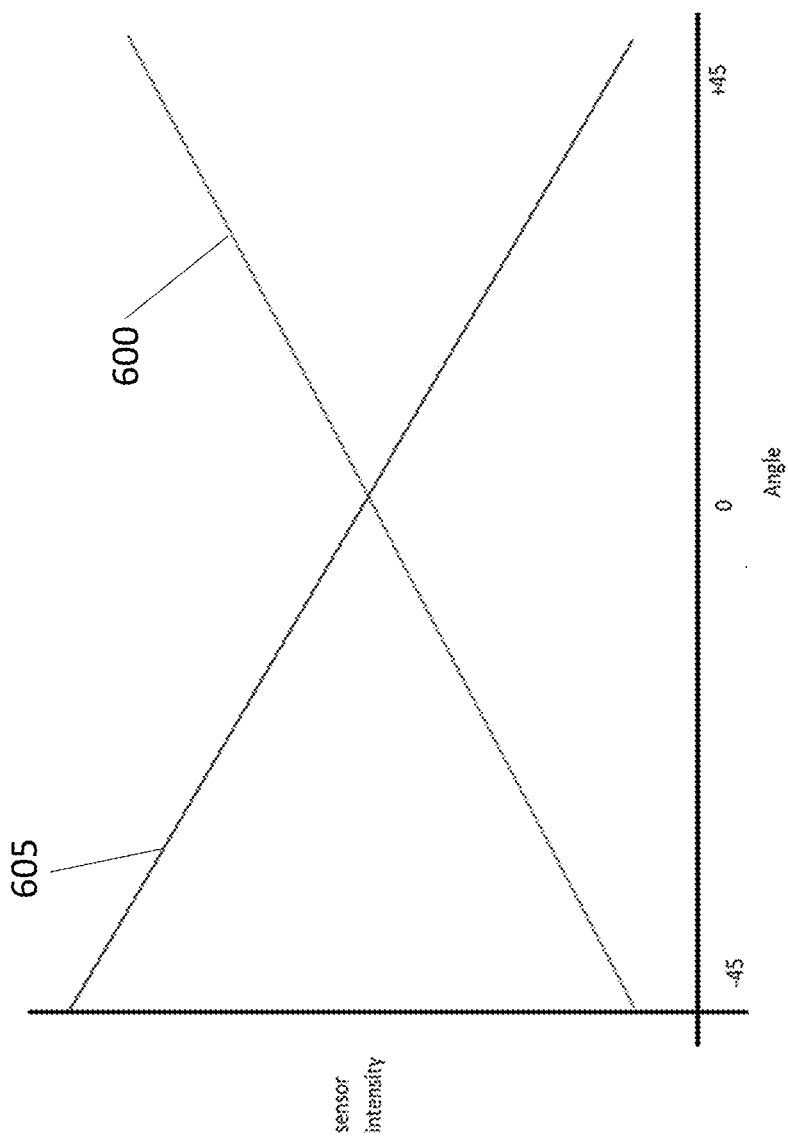
FIG. 6 is a chart depicting intensity of received signals from a transmission source of an upward facing receiver and a downward facing receiver in accordance with an illustrative embodiment.

FIG. 6 is a chart depicting intensity of received signals from a transmission source of an upward facing receiver and a downward facing receiver in accordance with an illustrative embodiment. The information in FIG. 6 is used to determine elevation of the rotorcraft. In this embodiment, the upward facing receiver is at a 45 degree angle relative to the rotor arm assembly on which it is mounted, and the downward facing receiver is at a −45 degree angle relative to the rotor arm assembly. In alternative embodiments, different angles of elevation can be used such as ±20 degrees, ±30 degrees, ±50 degrees, etc. In FIG. 6, plot 600 is intensity of the upward facing receiver and plot 605 is intensity of the downward facing receiver.

When the upward facing receiver and the downward facing receiver are at the bearing which points directly at the transmission source, the two receivers have the outputs for different transmitter elevations shown in FIG. 6. The elevation angle can then be computed as elevation=f(s1,s2), where s1 and s2 are the sensor intensities. While the exact function f depends on the angular response of the receivers, if they are linear as shown in FIG. 6, f is c*(s1−s2), where c is a constant based on the slope depicted in FIG. 6. For example, if a sensor value changes by x/degree, then c is 2*x.

Figure 7:
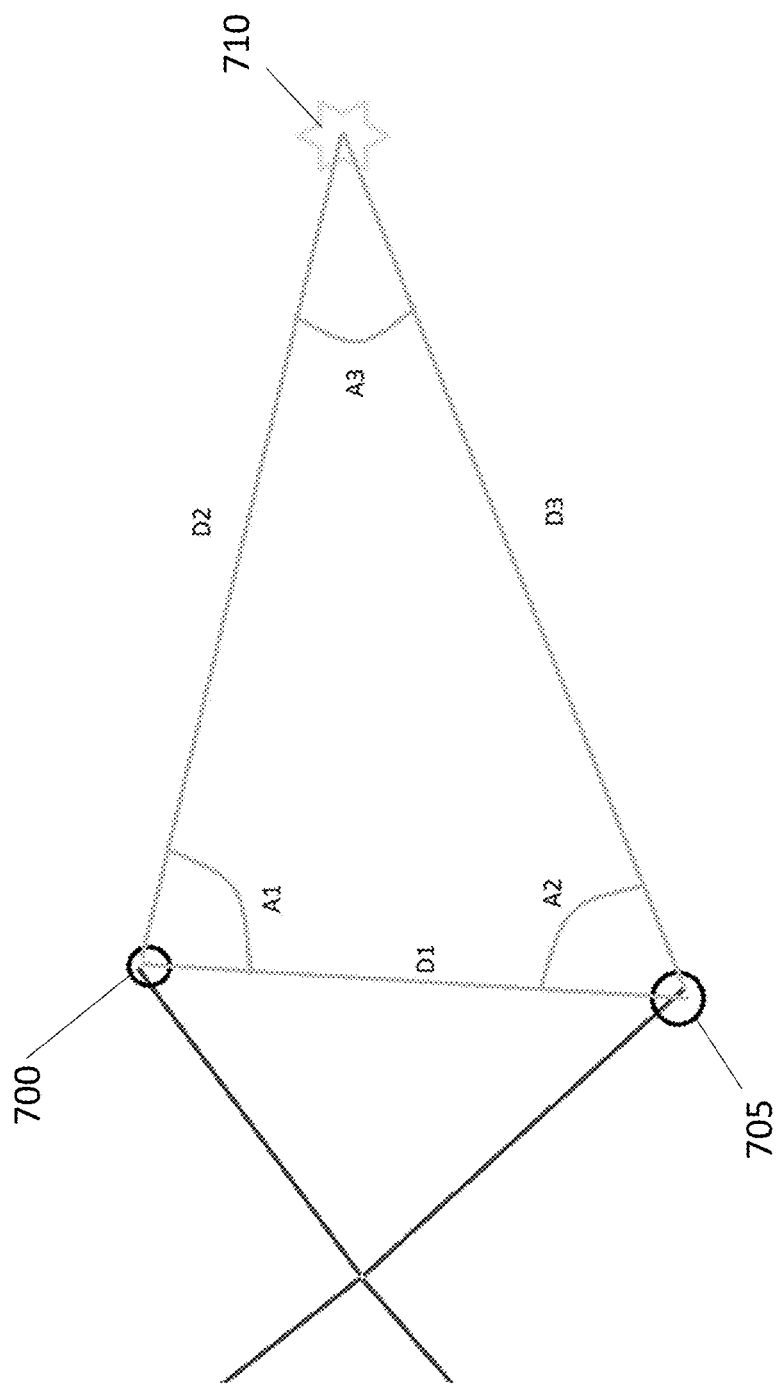
FIG. 7 is a diagram depicting the angle and distance relationship between two receivers on a rotorcraft and a transmission source in accordance with an illustrative embodiment.

FIG. 7 is a diagram depicting the angle and distance relationship between two receivers 700, 705 on a rotorcraft and a transmission source 710 in accordance with an illustrative embodiment. In an illustrative embodiment, the two receivers 700, 705 are included in different sensor units mounted to the rotorcraft. Each of the receivers 700, 705 receives a signal from the transmission source 710, and based on the received signal intensities the angles A1 and A2 of the receivers 700, 705 relative to the transmission source 710 are determined. FIG. 7 also depicts the angle A3. Additionally, since the receivers 700, 705 are mounted to the rotorcraft, a distance DI between the receivers 700, 705 is known. The distances between the receivers 700, 705 and the transmission source 710 are computed by using the parallax between the bearing sensing of the two receivers (i.e., A1, A2) with the known fixed distance D1. As shown in FIG. 7, the distance between the receivers and the transmission source is computed using the law of signs as follows: D2=D1*sin(A2)/sin(Pi−A2−A1) and D3=D1*sin(A1)/sin(Pi−A2−A1).

Thus, the system and methods described herein can be used to determine a bearing, elevation, and distance of receivers mounted on a rotorcraft (or other robot) relative to a transmission source. As discussed above, the transmission source can be stationary such as a docking station, landing pad, remote control, etc., or mobile such as another rotorcraft or other robot. The bearing and elevation can be determined by the sensor unit and transmitted from the sensor unit to a central controller of the rotorcraft. Alternatively, information received by the sensor unit can be directly transmitted to the central controller and the central controller can be used to perform the calculations to determine bearing and elevation. The distance can be calculated by the central controller based on information received from 2 or more different sensor units mounted on different portions of the rotorcraft.

Upon receipt or determination of the bearing, elevation, and distance information, the central controller can use this information to avoid objects, control a position of the rotorcraft relative to other objects, more accurately hold a desired position without drift, be directed to an object (with a known relation to a transmission source) that does not include a transmission source, perform swarming or other maneuvers with other rotorcraft, allow autonomous control of the rotorcraft, etc. Additionally, as discussed above, the receivers on the rotorcraft can be used to receive information/messages encoded into the signals from transmission sources. These messages can be used to send control instructions to the rotorcraft, to designate identities of transmission sources and other rotorcraft, and to alert the rotorcraft of other flying aircraft in the area.

In one embodiment, the operations described herein are implemented as computer-readable instructions stored on a tangible computer-readable medium such as a memory of a sensor unit or a memory of a central controller. Upon execution by a processor, the computer-readable instructions perform the operations herein to determine bearing, elevation, and or distance, and control the rotorcraft based on this information.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system for determining positional information of a rotorcraft, the system comprising:
    a central controller; and
    a first sensor unit mounted to a first propeller assembly of the rotorcraft and in communication with the central controller, wherein the first sensor unit includes:
        one or more first receivers configured to receive signals from a remote transmission source;
        a signal source mounted to a stationary portion of the rotorcraft, wherein the signal source transmits a constant signal;
        a processor configured to determine a bearing of the rotorcraft relative to the remote transmission source based in part on the signals received from the remote transmission source, and wherein the processor uses the first sensor unit mounted to the first propeller assembly to determine an angular position of a propeller of the propeller assembly relative to the rotorcraft based in part on the constant signal received from the signal source mounted to the stationary portion of the rotorcraft;
        a transmitter configured to transmit the bearing of the rotorcraft to the central controller of the rotorcraft; and
    a second sensor unit mounted to a second propeller assembly of the rotorcraft, wherein the second sensor unit includes one or more second receivers configured to receive the signals from the remote transmission source,
    wherein the one or more first receivers are a known distance from the one or more second receivers, and wherein the central controller is configured to:
        determine a first angle of the one or more first receivers relative to the remote transmission source;
        determine a second angle of the one or more second receivers relative to the remote transmission source; and
        determine a distance from the remote transmission source based on the first angle, the second angle, and the known distance.

2. The system of claim 1, wherein the signals received from the remote transmission source include embedded information, and wherein the transmitter is configured to transmit the embedded information to the central controller.

3. The system of claim 2, wherein the central controller is configured to control navigation of the rotorcraft based at least in part on the determined bearing and at least in part on the received embedded information.

4. The system of claim 1, wherein to determine the bearing the processor is configured to:
    determine a time at which a maximum intensity of the signals from the remote transmission source are received; and
    determine an angular position of the first sensor unit at the time at which the maximum intensity of the signals from the remote transmission source are received.

5. The system of claim 4, further comprising:
    the signal source mounted on the stationary portion of the rotorcraft; and
    one or more second receivers within the first sensor unit configured to receive the signals from the signal source, wherein the processor is configured to determine the angular position of the first sensor unit based at least in part on the angular position of the propeller.

6. The system of claim 5, wherein the signal source comprises an infrared light emitting diode, a magnet, a switch, or an encoder.

7. The system of claim 1, wherein the first angle is determined based in part on a time at which the one or more first receivers receive a maximum intensity of the signals from the remote transmission source.

8. The system of claim 1, wherein the processor is further configured to determine an elevation of the rotorcraft relative to the remote transmission source based on the signals received from the remote transmission source.

9. The system of claim 8, wherein the one or more first receivers configured to receive signals from the remote transmission source comprise a first receiver positioned at a first vertical angle relative to the remote transmission source and a second receiver positioned at a second vertical angle relative to the remote transmission source, and wherein the processor analyzes the signals received by the first receiver and the second receiver to determine the elevation of the rotorcraft relative to the remote transmission source.

10. The system of claim 1, wherein the remote transmission source comprises another rotorcraft.

11. A method for determining positional information of a rotorcraft, the method comprising:
  receiving, by a first sensor unit mounted on a first propeller assembly of the rotorcraft, signals transmitted from a remote transmission source;
  determining, by a processor of the first sensor unit, a bearing of the rotorcraft relative to the remote transmission source based in part on the signals received from the remote transmission source;
  receiving, by the processor, a constant signal from a signal source that is mounted to a stationary portion of the rotorcraft;
  determining, by the processor and based on the first sensor unit mounted on the first propeller assembly, an angular position of a propeller of the propeller assembly relative to the rotorcraft based in part on the constant signal received from the signal source mounted to the stationary portion of the rotorcraft;
  transmitting, by a transmitter of the first sensor unit, the bearing of the rotorcraft to a central controller of the rotorcraft;
  receiving, by a second sensor unit mounted on a second propeller assembly of the rotorcraft, the signals transmitted from the remote transmission source, wherein the first sensor unit and the second sensor unit are a known distance from one another;
  determining a first angle of the first sensor unit relative to the remote transmission source;
  determining a second angle of the second sensor unit relative to the remote transmission source; and
  determining a distance from the remote transmission source based on the first angle, the second angle, and the known distance.

12. The method of claim 11, further comprising determining, by the processor, an angular position of the first sensor unit based at least in part on the angular position of the propeller, wherein the bearing of the rotorcraft is determined based in part on the angular position.

13. The method of claim 11, further comprising:
  determining a time at which the first sensor unit receives a maximum intensity of the signals from the remote transmission source;
  determining, based at least in part on the angular position of the propeller, an angular position of the first sensor at the time at which the first sensor unit receives the maximum intensity of the signals; and
  determining the first angle based in part on the angular position of the first sensor unit.

14. The method of claim 11, further comprising determining, by the processor of the sensor unit, an elevation of the rotorcraft relative to the remote transmission source.

15. The method of claim 14, further comprising:
  receivingfirst signals with a first receiver of the first sensor unit positioned at a first vertical angle relative to the remote transmission source;
  receiving second signals with a second receiver of the first sensor unit positioned at a second vertical angle relative to the remote transmission source; and
  determining the elevation by analyzing the first signals and the second signals.

16. The method of claim 14, further comprising:
  receiving, by the first sensor unit, embedded information in the signals transmitted by the remote transmission source; and
  controlling, by the central controller, navigation of the rotorcraft based at least in part on the determined bearing, the determined distance, the determined elevation, and at least in part on the received embedded information.

17. The method of claim 16, wherein the embedded information comprises at least one of an identifier of the remote transmission source, an instruction to proceed to a given location, and a location of an object relative to the remote transmission source.

* * * * *